(12) United States Patent
Kayama et al.

(10) Patent No.: US 7,580,387 B2
(45) Date of Patent: Aug. 25, 2009

(54) TIME SLOT ASSIGNING METHOD, SIGNAL TRANSMISSION METHOD, BASE STATION CONTROL APPARATUS, BASE STATION, AND MOBILE STATION USED IN A MOBILE COMMUNICATIONS SYSTEM

(75) Inventors: Hidetoshi Kayama, Yokohama (JP); Lan Chen, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 875 days.

(21) Appl. No.: 10/195,374

(22) Filed: Jul. 16, 2002

(65) Prior Publication Data

US 2003/0017830 A1 Jan. 23, 2003

(30) Foreign Application Priority Data

Jul. 17, 2001 (JP) ............................. 2001-216453

(51) Int. Cl.
*H04Q 7/00* (2006.01)
*H04Q 7/20* (2006.01)
*H04L 12/28* (2006.01)

(52) U.S. Cl. ...................... 370/329; 370/431; 455/450; 455/509

(58) Field of Classification Search ........................ None
See application file for complete search history.

(56) References Cited

U.S. PATENT DOCUMENTS

| | | | |
|---|---|---|---|
| 6,016,311 A | | 1/2000 | Gilbert et al. |
| 6,021,329 A | * | 2/2000 | Kornestedt et al. ........... 455/446 |
| 6,028,853 A | * | 2/2000 | Haartsen ...................... 370/338 |
| 6,041,238 A | * | 3/2000 | Tanoue ..................... 455/452.2 |
| 6,101,176 A | * | 8/2000 | Honkasalo et al. ........... 370/335 |
| 6,424,645 B1 | * | 7/2002 | Kawabata et al. ........... 370/347 |

FOREIGN PATENT DOCUMENTS

DE 198 40 510 3/2000

(Continued)

OTHER PUBLICATIONS

N. Miki, et al., The Institute of Electronics. Information and Communication Engineers, Technical Report of IEICE, vol. 100, No. 664, pp. 93-98, "A Study on Uplink Slot Assignment Scheme for DS-CDMA/TDD Based Asymmetric Radio Communication Systems", Mar. 9, 2001 (with English Abstract).

I. Katzela. et al., IEEE Personal Communications, vol. 3, No. 3, XP-000593925, pp. 10-31, "Channel Assignment Schemes for Cellular Mobile Telecommunication Systems: A Comprehensive Survey", Jun. 1, 1996.

* cited by examiner

*Primary Examiner*—Edan Orgad
*Assistant Examiner*—Blanche Wong
(74) *Attorney, Agent, or Firm*—Oblon, Spivak, McClelland, Maier & Neustadt, P.C.

(57) ABSTRACT

A time slot assigning method for assigning a time slot for transmission of a signal between a base station and a mobile station in each frame is provided. The method comprises assigning a first slot group used for transmission of a down signal from the base station to the mobile station; assigning a second slot group used for transmission of an up signal from the mobile station to the base station are assigned; and arranging a third slot group immediately after the first slot group, the third slot group being used giving a priority to transmission of another down signal from the base station to the mobile station.

18 Claims, 11 Drawing Sheets

TIME SLOT ASSIGNING METHOD, SIGNAL TRANSMISSION METHOD, BASE STATION CONTROL APPARATUS, BASE STATION, AND MOBILE STATION USED IN A MOBILE COMMUNICATIONS SYSTEM

BACKGROUND OF THE INVENTION

1. Field of the Invention

The present invention relates to a time slot assigning method and a signal transmission method used in a mobile communications system, and more particularly, to a technique for assigning time slots to an uplink and a downlink for transmitting signals between a base station and a mobile station.

The invention is also directed to a base station control apparatus that controls assignment of time slots carried out at a base station based on the above-described time slot assigning method.

The invention is also directed to a base station and a mobile station, which transmit and receive signals using time slots assigned in accordance with the time slot assigning method.

2. Description of Related Art (Conventional Technique 1)

In wideband-CDMA (W-CDMA), which is one of the third-generation mobile communications schemes, there are two known systems, that is, FDD (frequency division duplex) and TDD (time division duplex) systems. With FDD, uplink and downlink are assigned different frequency channels. With TDD, transmission signals are multiplexed in a time-dividing manner.

It is expected, in the coming fast multimedia communications, that the traffic will increase more and more on both uplink and downlink, as compared with conventional audio-related services. Since TDD can assign time slots to uplink and downlink channels easily and efficiently, while dealing with asymmetric traffic, the TDD system is a preferable system answering the needs for fast communications in increasing traffic.

In mobile communications, cells of respective base stations are arranged so as to cover the service area without discontinuity in order to two-dimensionally spread the service area. In such a cell arrangement, it is necessary to prevent interference from adjacent cells.

Figure 1:
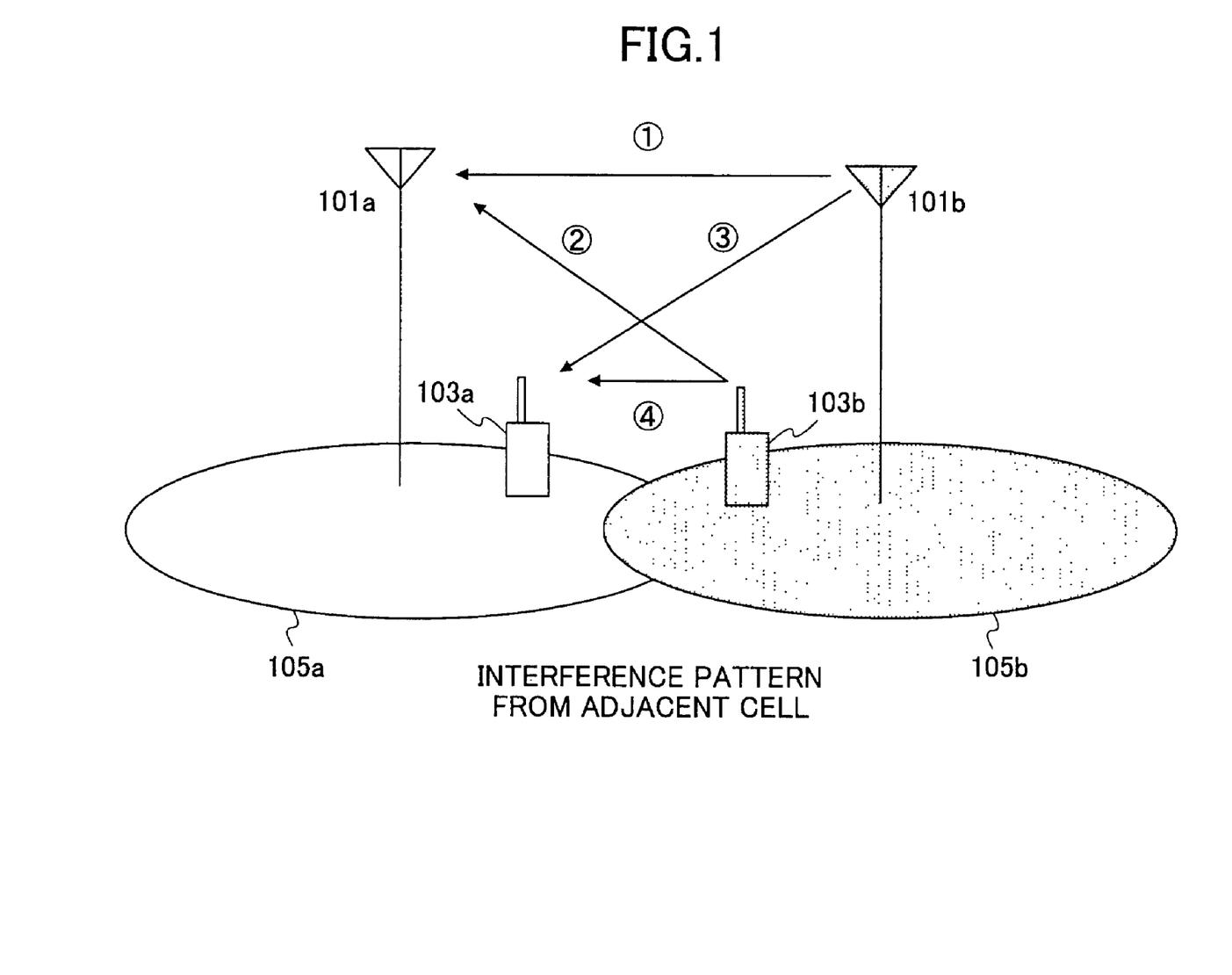
FIG. 1 illustrates interference patterns influenced by the adjacent cell.

FIG. 1 illustrates interference patterns from the adjacent cell. Base station 101a defines a cell 105a, and base station 101b defines a cell 105b. The cell 105a is subjected to interference from the adjacent cell 105b. Interference is categorized in four patterns (indicated by the circled figures in FIG. 1) listed below.

1. Interference at base station 101a received from the base station 101b of the adjacent cell
2. Interference at base station 101a received from the mobile station 103b located in the adjacent cell
3. Interference at mobile station 103a received from the base station 101b of the adjacent cell
4. Interference at mobile station 103a received from the mobile station 103b located in the adjacent cell.

Among these, pattern 1 is the most severe because the desired wave from the mobile station is weak, while the wave from the base station is strong. In addition, the wave from the base station is unobstructed because in general base stations are set up at a higher place. If the mobile stations 103a and 103b are located close to each other, interference 4 may also become serious. In a W-CDMA TDD system, the base stations included in the system synchronize with each other so as not to produce interference adversely affecting adjacent cells. In other words, the operations of the base stations have to be controlled so that the signal transmission timings are the same among all the base stations.

(Conventional Technique 2)

The above-described conventional W-CDMA TDD system is capable of preventing interference patterns 1 and 4 because all the base stations in the system take the same transmission timing. However, this system is incapable of dynamic time-slot assignment of uplink and downlink for each cell. For this reason, the conventional TDD system cannot flexibly cope with changes in up and down traffic that vary in a dynamic manner. To solve this problem, HIPERLAN (high performance radio LAN) Type 2, which is one of the radio LAN standards defined by ETSI (European Telecommunication Standards Institute), has been proposed. HIPERLAN Type 2 employs a DFS (dynamic frequency selection) technique that monitors multiple frequency channels and carries out communications using unused channels. With HIPERLAN Type 2, different frequency channels are used in adjacent cells, and consequently, interference pattern 1 shown in FIG. 1 can be prevented. At the same time, assignment of time slots for the uplink and downlink is controlled dynamically for each cell.

(Conventional Technique 3)

Improvement of a W-CDMA TDD system for dynamically controlling uplink and downlink time slots has also been proposed. An example of such improvement uses a punctured code on the downlink, and assigns uplink slots in the erase bits. See Miki, Sanbe, and Morinaga, "Study of Uplink Slot Assigning Control for Up/down Asymmetric System Using DS-CDMA/TDD", Shingaku Gihou RS2000-259. With this proposal, punctured codes are applied to the down signals, and their erase bits are arranged in time slots. A portion of the erase bits are assigned as uplink slots depending on the uplink traffic.

In a mobile communications system employing W-CDMA TDD, if transmission timing for uplink slot and downlink slot differs among different base stations, serious interference occurs on an uplink signal from a mobile station to a base station in a cell due to signal transmission from the adjacent base station 101b through the downlink. The above-described conventional technique 1 avoids such interference by synchronizing the uplink and downlink transmission timings at all the base stations. However, this system can not change the ratio between the uplink slot and the downlink slot in the communications environment where the traffic condition differs among cells. It is difficult for the mobile communications system using conventional W-CDMA TDD to assign resources in response to asymmetric changes in traffic on the uplink and the downlink, and therefore, satisfactory channel efficiency can not be obtained.

HYPERLAN Type 2 described in the conventional technique 2 can solve the above-described two problems by changing the frequencies of adjacent cells. However, this technique is not practical because it requires a number of frequency channels (and therefore, a broad frequency band) in order to avoid mutual interference in a mobile communications system defining a two-dimensional service area.

The W-CDMA TDD system using a punctured code described in the conventional technique 3 causes throughput to decrease because a convolutional code with a low encoding rate is applied to the downlink signal in advance. In addition, this system only prevents the interference on the downlink signal.

SUMMARY OF THE INVENTION

Therefore, it is the first object of the invention to provide a time slot assignment method and a signal transmission method that can sufficiently reduce interference from adjacent stations even if signal transmission timings of base stations are not synchronized with each other. These methods can also guarantee high-quality and high-efficiency radio channels in a TDD mobile communications system by varying the resources assigned to the uplink and the downlink in response to changes in traffic for each cell.

It is the second object of the invention to provide a base station control apparatus that controls assignment of time slots carried out at a base station according to the above-described time slot assigning technique.

It is the third object of the invention to provide a base station and a mobile station that can transmit and receive signals between themselves using time slots assigned by the base station control apparatus.

To achieve the first object, first through third slot groups are assigned for each frame, and the third slot group is used as a flexible or multi-purpose slot group depending on traffic between a base station and a mobile station.

To be more precise, a time slot assigning method for assigning a time slot used for transmission of a signal between a base station and a mobile station in each frame comprises the steps of assigning a first slot group used for transmission of a down signal from the base station to the mobile station; assigning a second slot group used for transmission of an up signal from the mobile station to the base station is assigned; and arranging a third slot group immediately after the first slot group, the third slot group being used giving a priority to transmission of another down signal.

The time slot assigning method further comprises the step of defining an interference monitoring slot in the third slot group. The interference monitoring slot is used to monitor interference from other base stations if there is no other down signal to be transmitted in the third slot group.

The time slot assigning method also comprises the step of providing a switching slot in the third slot group. In this case, a time slot after the switching slot is used to transmit another up signal from the mobile to the base station in the third slot group.

In a preferable example, if there is another down signal to be transmitted from the base station at the end of the first slot group, said other down signal is transmitted using a portion of the third slot group. In other words, if the radio resources for downlink transmission (that is, the first slot group) are insufficient, the subsequent third slot group is assigned to the transmission of the remaining down signals. If there is no other down signal to be transmitted in the third slot group, the third slot group is used for other purposes, for example, monitoring interference or transmitting up signals.

This arrangement can flexibly cope with changes in uplink and downlink traffic, and prevent the transmitted information from being cut off at the receiving side. Consequently, high-quality real-time applications are provided.

Preferably, the switching slot is provided if the interference level monitored in the interference monitoring slot satisfies a predetermined condition, for example, if the interference level becomes on or below a predetermined threshold level. In this case, a time slot after the switching slot is used to transmit up signals using the remaining portion of the third slot group. Accordingly, the resources can be used efficiently with high flexibility.

The ratio of time slots between the first, second, and third slot groups are determined based on uplink and downlink traffic. This arrangement allows assignment of time slots dynamically in response to changes in uplink and downlink traffic for each cell. The parameter for determining the ratio is, for example, the amount of measured traffic, the ratio of downlink traffic to uplink traffic, or other parameters expressed by traffic.

In another aspect of the invention, a signal transmission method is provided to achieve the first object. The signal transmission method comprises the steps of determining a first slot group, a second slot group, and a third slot group in each radio frame, the third slot group being used for multiple purposes; transmitting a down signal from the base station to the mobile station using the first slot group; transmitting another down signal using at least a portion of the third slot group if there is said other down signal to be transmitted after the first slot group has been used; and transmitting an up signal from the mobile station to the base station using the second slot group.

Preferably, the signal transmission method further comprises the steps of monitoring interference from other base stations using a portion of the third slot group; determining whether the interference satisfies a predetermined condition; and generating a switching signal if the interference satisfies the predetermined condition in order to allow the mobile station to transmit another up signal using the third sot group.

With this method, if there is no other down signal to be transmitted in the third slot group (including the case in which transmission of down signals is terminated halfway through the third slot group), interference from surrounding base stations is monitored using at least a portion of the remaining part of the third slot group. This arrangement allows the interference condition due to signal waves from other base stations to be taken into account when controlling signal transmission. Only when the monitored interference satisfies a predetermined condition, the mobile station is allowed to transmit up signals to the base station. Such up signals are thereby not subjected to the adverse influence of interference, and signal quality is maintained high.

Preferably, the signal transmission method further comprises the steps of determining an order of priority for the up signal and said other up signal. In this case, said other up signal is transmitted using the remaining portion of the third slot if said other up signal has a lower priority. Up signals with higher priorities are transmitted using the second slot group that suffers less from interference. Consequently, transmission quality for up signals is maintained satisfactory.

To achieve the second object, a base station control apparatus inserted between a base station and a mobile station in a mobile communications system is provided. The base station control apparatus comprises a traffic data collecting unit configured to collect traffic data from the base station; and a slot group determination unit that assigns a first slot group used for transmission of a down signal from the base station to the mobile station, a second slot group used for transmission of an up signal from the mobile station to the base station, and a third slot group used giving a priority to transmission of another down signal from the base station to the mobile station for each frame, based on the traffic data.

To achieve the third object, a base station in a mobile communications system is provided. The base station comprises an interface that receives assignment of time slots for each frame from an external control apparatus. Such frame includes a first slot group, a second slot group, and a third slot group determined by the external control apparatus. The base station also comprises a controller connected to the interface. The controller causes the base station to transmit a down signal to a mobile station using the first slot group, causes the base station to use a portion of the third slot group to transmit another down signal if there is said other down signal to be transmitted after the first slot group has been used, and causes the base station to receive an up signal from the mobile station using the second slot group.

To achieve the third object, a mobile station comprises a radio frequency processing unit configured to receive a down signal transmitted from a base station using a first slot group in a frame and to transmit an up signal to the base station using a second slot group in the frame; and a controller configured to causes the radio frequency processing unit to receive another down signal from the base station using a portion of a third slot group in the frame and/or to transmit another up signal to the base station using a remaining portion of the third slot group.

BRIRF DESCRIPTION OF THE DRAWINGS

Other objects, features, and advantages of the invention will become more apparent from the following detailed description when read in conjunction with the accompanying drawings, in which.

DETAILED DESCRIPTION OF THE PREFERRED EMBODIMENTS

The details of the preferred embodiments of the invention will now be described with reference to the attached drawings.

Figure 2:
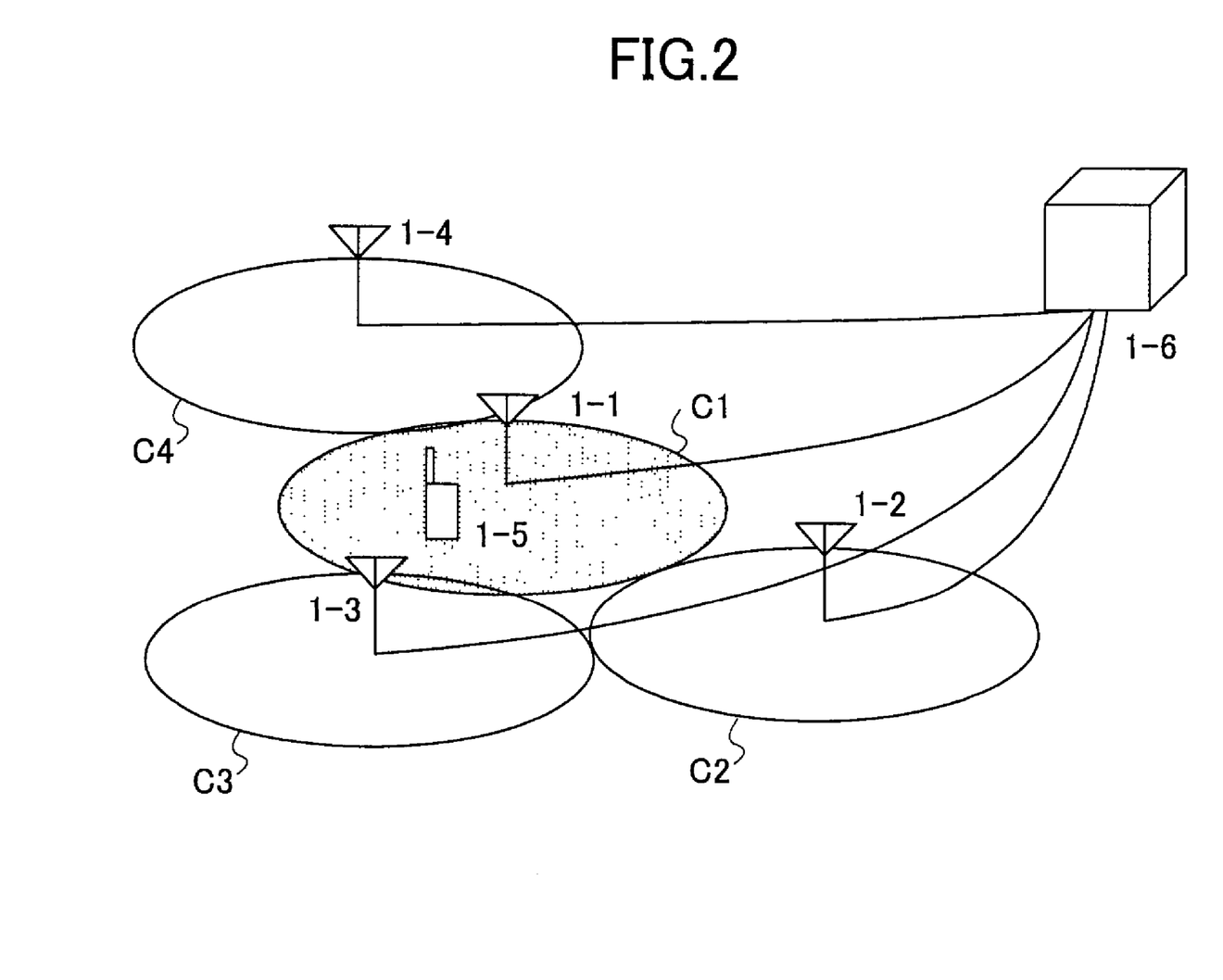
FIG. 2 schematically illustrates the structure of a mobile communications system to which time slot assignment and signal transmission are applied according to an embodiment of the invention.

FIG. 2 illustrates an example of a mobile communications system to which a time slot assigning method and a signal transmission method are applied according to an embodiment of the invention. This system employs, for example, time division duplex, and it is hereinafter referred to as a TDD mobile communication system.

In FIG. 2, the TDD mobile communication system comprises a base station control apparatus 1-6, and multiple base stations 1-1, 1-2, 1-3, and 1-4, each defining one of the cells C1-C4. Focusing now on cell C1, a mobile station 1-5 is located in cell C1, and adjacent base stations 1-2, 1-3 and 1-4 that define surrounding cells C2, C3 and C4, respectively, may give interference to the base station 1-1.

The base stations 1-1 through 1-4 are connected to the base station control apparatus 1-6. Each of the base stations 1-1, 1-2, 1-3 and 1-4 carries out prescribed data communications with mobile stations located in its cell at the timing of time slot determined by the base station control apparatus 1-6. The base station control apparatus 1-6 determines a ratio of time slot groups used in signal transmission for each of the base stations 1-1 through 1-4. The base station control apparatus 1-6 also controls establishment and connection of radio links, and handover of mobile stations. Although in the embodiment the base station control apparatus 106 is provided independently, the invention is not limited to this example. For example, the functions of the base station control apparatus 1-6 may be provided at switching nodes of the mobile communications network.

Figure 3:
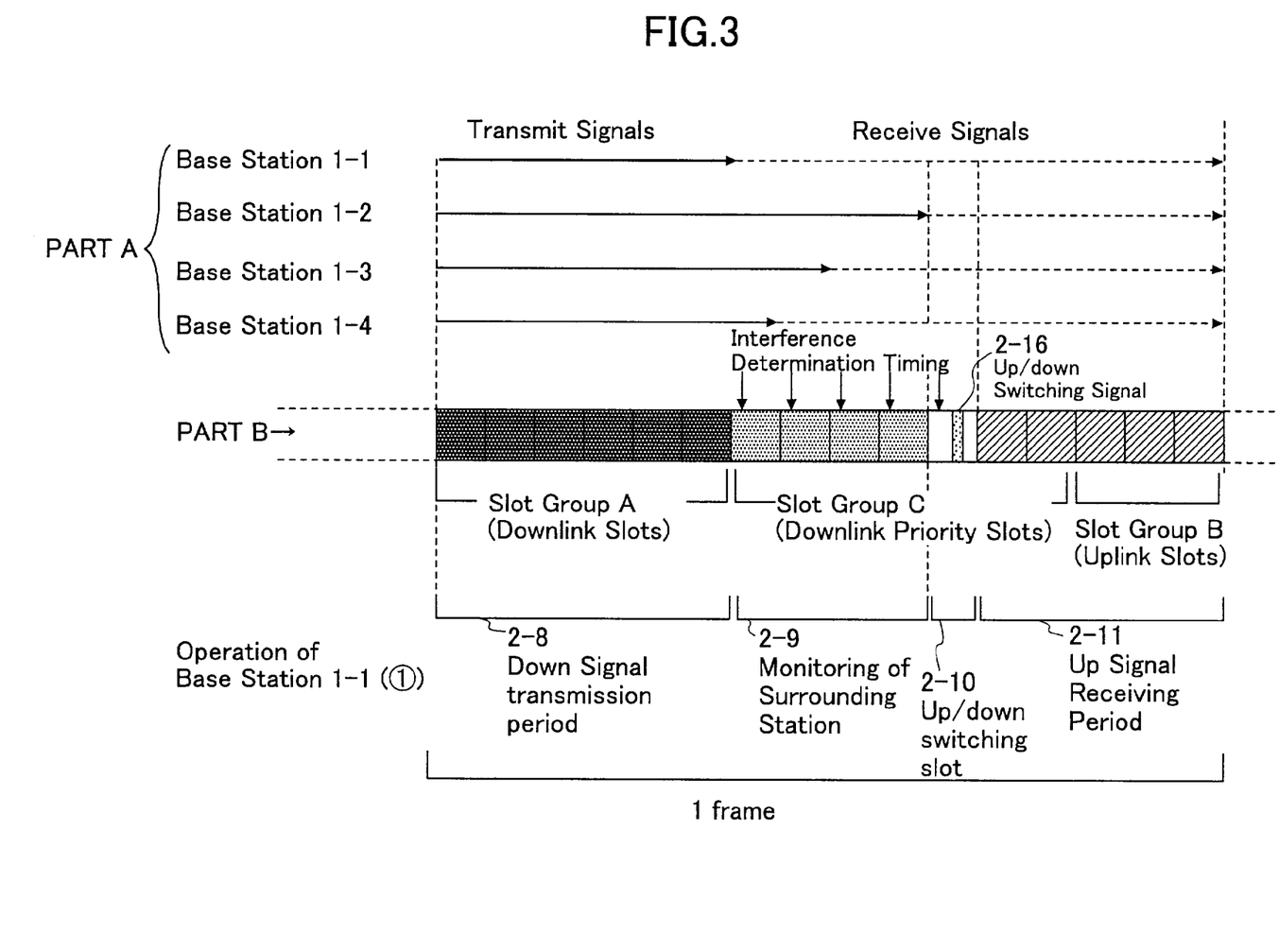
FIG. 3 illustrates a frame structure having time slots defined by the time slot assigning method of the invention, as well as signal transmission timing at the base station.

FIG. 3 illustrates an example of a radio frame (hereinafter, simply referred to as "frame") consisting of multiple successive time slots (hereinafter, simply referred to as "slot") determined in accordance with a time slot assigning method of the invention. FIG. 3 also illustrates signal transmission timings of the base stations in accordance with a signal transmission method of the invention.

To be more precise, Part A in FIG. 3 illustrates transmitting and receiving signals at each of the base stations 1-1 through 1-4. The solid arrow indicates signal transmitting and the dashed arrow indicates signal receiving. The frames of the base stations 1-1 through 1-4 are synchronized with each other; however, uplink and downlink transmission timings are not synchronized among the base stations. Part B in FIG. 3 illustrates a slot structure of a frame of the base station 1-1.

In the example shown in FIG. 3, a frame of the base station 1 consists of slot group A including 6 slots from the beginning, slot group C including 7 slots (7th slot through $13^{th}$ slot), and slot group B including 3 slots ($14^{th}$ slot through $16^{th}$ slot). Slot group A is a downlink slot group, through which a signal is transmitted from the base station 1-1 to the mobile station 1-5 (see FIG. 2). In slot group C, priority is given to transmitting downlink signals. To this end, slot group C is referred to as a downlink priority slot group. If there are no more signals to be transmitted from the base station 1-1 to the mobile station, then, the base station 1-1 stops transmitting down signals and starts monitoring the interference level from the surrounding stations 1-2 through 1-4 (or mobile stations located near cell C1 if there are any) using the downlink priority slots. For example, if the base station 1-1 finishes transmitting signals within the region of slot group A, the communication mode is switched from the transmit mode to the receive mode, as indicated by the dashed arrow in Part A. Then, the base station 1-1 uses slot group C to monitor the interference waves coming from surrounding stations.

The base station 1-1 checks the level of the interference waves at the beginning of each slot, as indicated by the vertical arrows of "Interference Determination Timing" in Part B. In the example shown in FIG. 3, the base station 1-2 terminates signal transmission at the $10^{th}$ slot, the base station 1-3 terminates signal transmission at the $8^{th}$ slot, and the base station 1-4 terminates signal transmission at the $7^{th}$ slot, as illustrated in Part A. Consequently, the level of the interference waves monitored at the base station 1-1 becomes smaller than the threshold at the $11^{th}$ slot (because the signal transmissions from the surrounding base stations 1-2 through 1-4 terminate by the $10^{th}$ slot).

If the level of the interference waves from the base stations 1-2 through 1-4 lowers to or below the threshold during the monitoring period 2-9, the base station 1-1 switches the available slot from downlink to uplink. The switching between downlink and uplink is carried out by transmitting an up/down switching signal 2-16 from the base station 1-1 to the mobile station 1-5. The slot used to transmit the up/down switching signal is called an up/down switching slot 2-10.

Then, the up signal receiving period 2-11 starts from the $12^{th}$ slot. In response to the up/down switching signal 2-16, the mobile station 1-5 transmits up signals to the base station 1-1 using a part of slot group C as well as using slot group B. The base station 1-1 receives the up signals from the mobile station at the hatched slots across slot groups C and B. It should be noted that no base stations transmit down signals beyond slot group C, and that up signals are received in the subsequent slot group B without conditions. The down signals are transmitted from the base station from the head of each frame.

Slot group A, slot group B, and slot group C may be referred to as the first slot group, the second slot group, and the third slot group, respectively.

Figure 4:
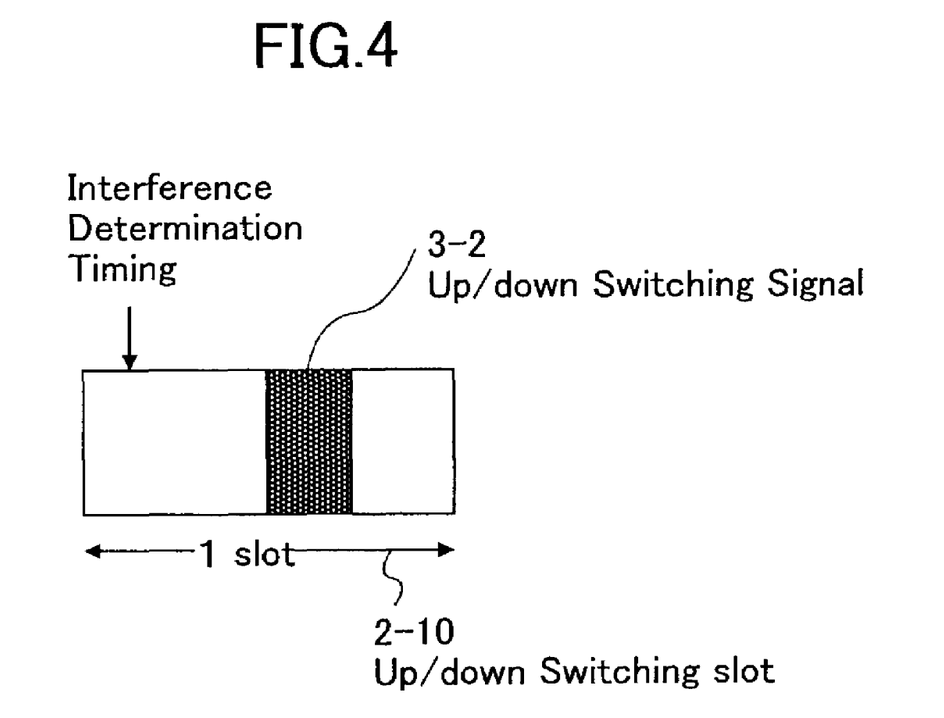
FIG. 4 illustrates control timing in the up/down switching slot shown in FIG. 3.

FIG. 4 illustrates the switching timing at the up/down switching slot 2-10 shown in FIG. 3. If interference is not detected at the interference determination timing set at the beginning of the up/down switching slot 2-10, the base station 1-1 generates and transmits an up/down switching signal 3-2 to the mobile station 1-5 in the latter half of this slot. The transmission of the up/down switching signal 3-2 is controlled so as not to overlap the interference determination timing. When the mobile station 1-5 has received the up/down switching signal, it starts transmitting up-signals as from the next slot. If it is difficult for the mobile station to start transmitting up signals beginning from the next slot due to control delay or propagation delay in the hardware, the mobile station starts transmission at the slot after the next slot.

In this manner, the base station monitors interference from the surrounding stations using the downlink priority slots. When interference is not detected (or when the interference level lowers to or below the threshold) during the monitoring, the base station 1-1 allows the mobile station 1-5 to transmit up signals to the base station 1-1. In consequence, even if the signal transmission timings of the surrounding base stations are not synchronized with each other, interference from the surrounding base stations 1-2, 1-3 and 1-4, which diversely affects the uplink from the mobile station 1-5, is reduced efficiently. Each of slot groups A, B, and C are dynamically controlled (which means that the ratio between slot groups A, B and C is variable) in accordance with changes in traffic in each cell. Dynamic control of the slot ratio between groups A, B, and C will be explained in detail below.

Figure 5:
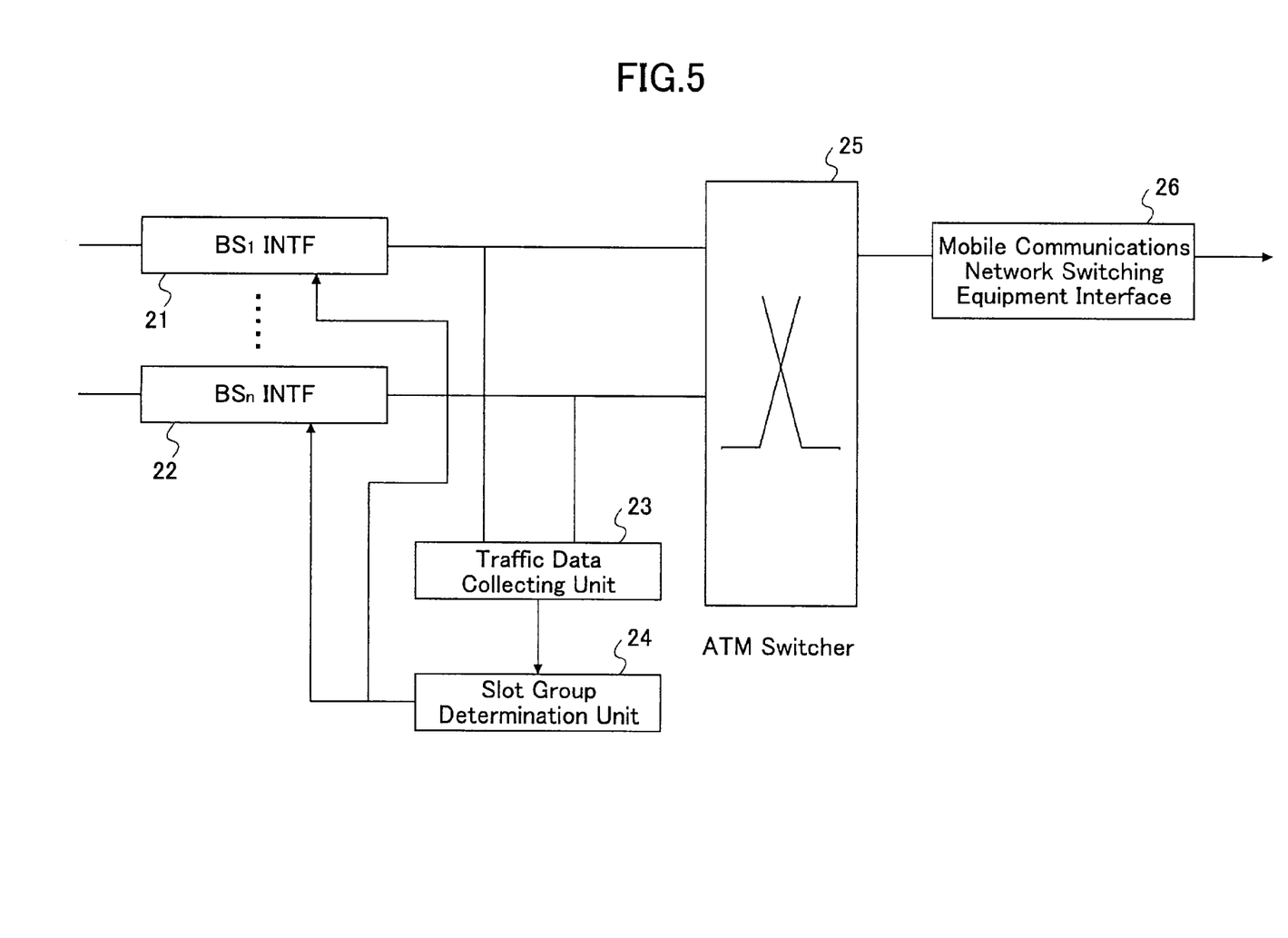
FIG. 5 illustrates the structure of the base station control apparatus according to an embodiment of the invention.

FIG. 5 illustrates the structure of the base station control apparatus 1-6 that dynamically determines the ratio of slots assigned for groups A, B, and C. The base station control apparatus 106 includes n base station interfaces ($BS_1$ INTF 21 through $BS_n$ INTF 22), a traffic data collecting unit 23, a slot group determination unit 24, an ATM switcher 25, and a mobile communications network switching equipment interface 26.

The interfaces $BS_1$ INTF through $BS_n$ INTF are provided corresponding to the base stations connected to the base station control apparatus 1-6. In the example shown in FIG. 1, $BS_1$ INTF through $BS_4$ INTF are provided corresponding to the base stations 1-1 through 1-4 in order to transmit and receive signals between these base stations.

The traffic data collecting unit 23 generates and transmits a traffic data collection command to the base stations 1-1 through 1-4 via the corresponding interfaces. When receiving the traffic data from the base stations, the traffic data collecting unit 23 calculates the average of the uplink/downlink traffic ratios and the standard deviation for each base station based on the gathered traffic data. The calculation results are supplied to the slot group determination unit 24. The slot group determination unit 24 updates the ratio between the uplink slots (Group A), the downlink slots (Group B), and the downlink priority slots (Group C) for each base station, based on the information supplied from the traffic data collecting unit 23. The traffic data collecting unit 23 and the slot group determination unit 24 constitute a time slot assigning member. The ATM switcher 25 transfers the data obtained via one of the interfaces $BS_1$ INTF through $BS_n$ INTF from each cell to another ATM switcher at the next node through the mobile communications network switching equipment interface 26.

Figure 6:
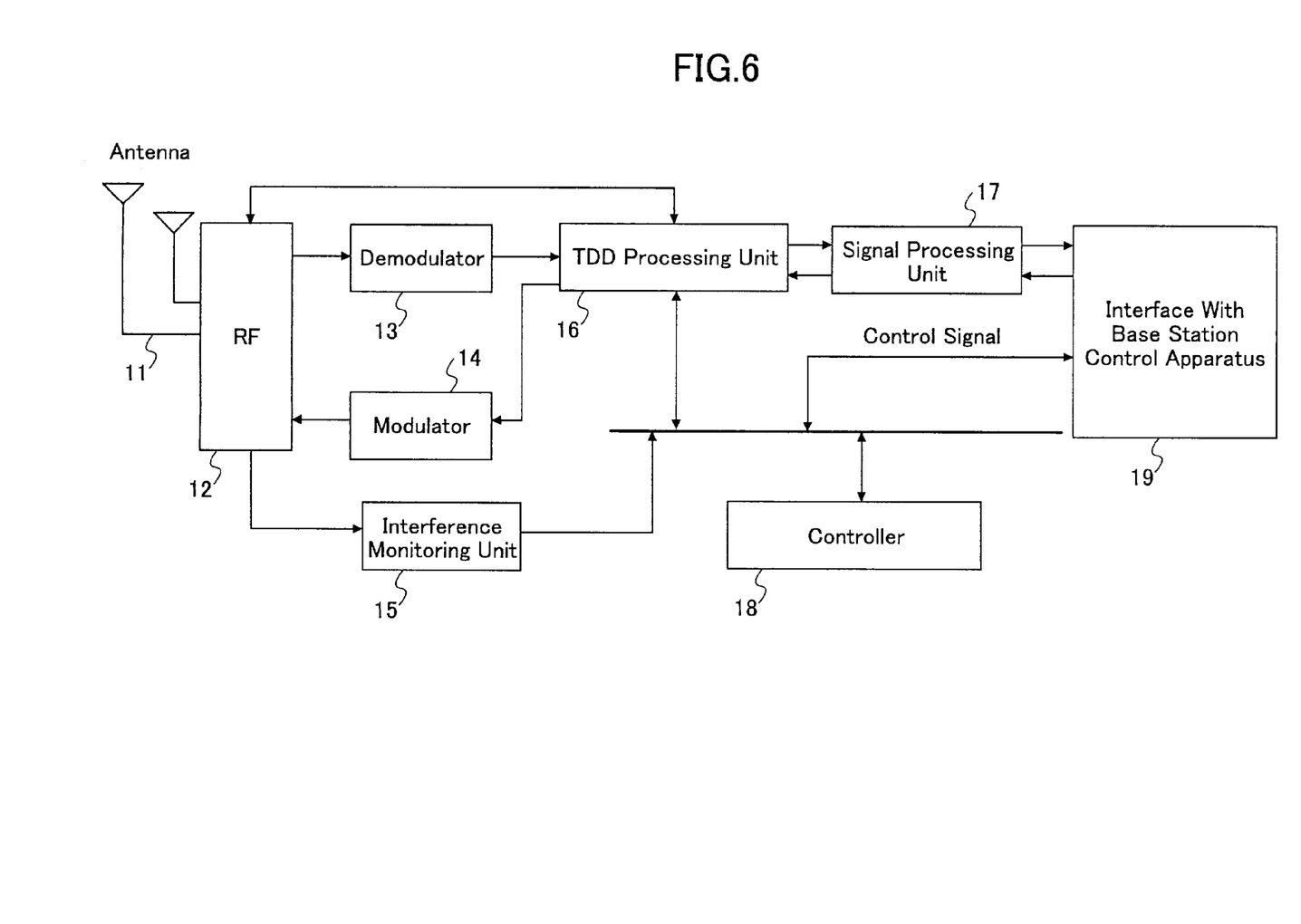
FIG. 6 illustrates the structure of the base station according to an embodiment of the invention.

FIG. 6 illustrates the structure of the base station 1-1, which transmits signals using slot groups A, B, and C determined by the base station control apparatus 1-6.

The base station 1-1 comprises an antenna 11, an RF processing unit 12, a demodulator 13, a modulator 14, an interference monitoring unit 15, a TDD processing unit 16, a signal processing unit 17, a controller 18, and an interface 19 with the base station control apparatus 1-6.

The antenna 11 receives a radio frequency signal from the mobile station 1-5, and transmits a radio frequency signal to the mobile station 1-5. The RF processing unit 12 down-converts the signal received at the antenna 11 and supplies the converted signal to the demodulator 13. The RF processing unit 12 also up-converts the transmission signal output from the TDD processing unit 16 and modulated by the modulator 14. The modulator 14 and the demodulator 13 convert signals into a desired format.

The interference monitoring unit 15 monitors the interference waves from the adjacent base stations, which are detected by the RF processing unit 12. The TDD processing unit 16 regulates timing of slots for transmitting and receiving signals to and from the mobile station 1-5, and supplies a slot switching instruction to the RF processing unit 12. The signal processing unit 17 encodes and decodes the original signal. The controller 18 determines whether or not the level of the interference waves monitored by the interference monitoring unit 15 is on or below the predetermined threshold. Based on the determination result, the controller 18 causes the TDD processing unit 16 to control up-signal receiving timing from the mobile station 1-5. The base station 1-1 receives signals from the base station control apparatus 1-6 via the interface 19. Among the received signals, the data signal is supplied to the signal processing unit 17, while the control signal is supplied to the controller 18, from the interface 19.

Figure 7:
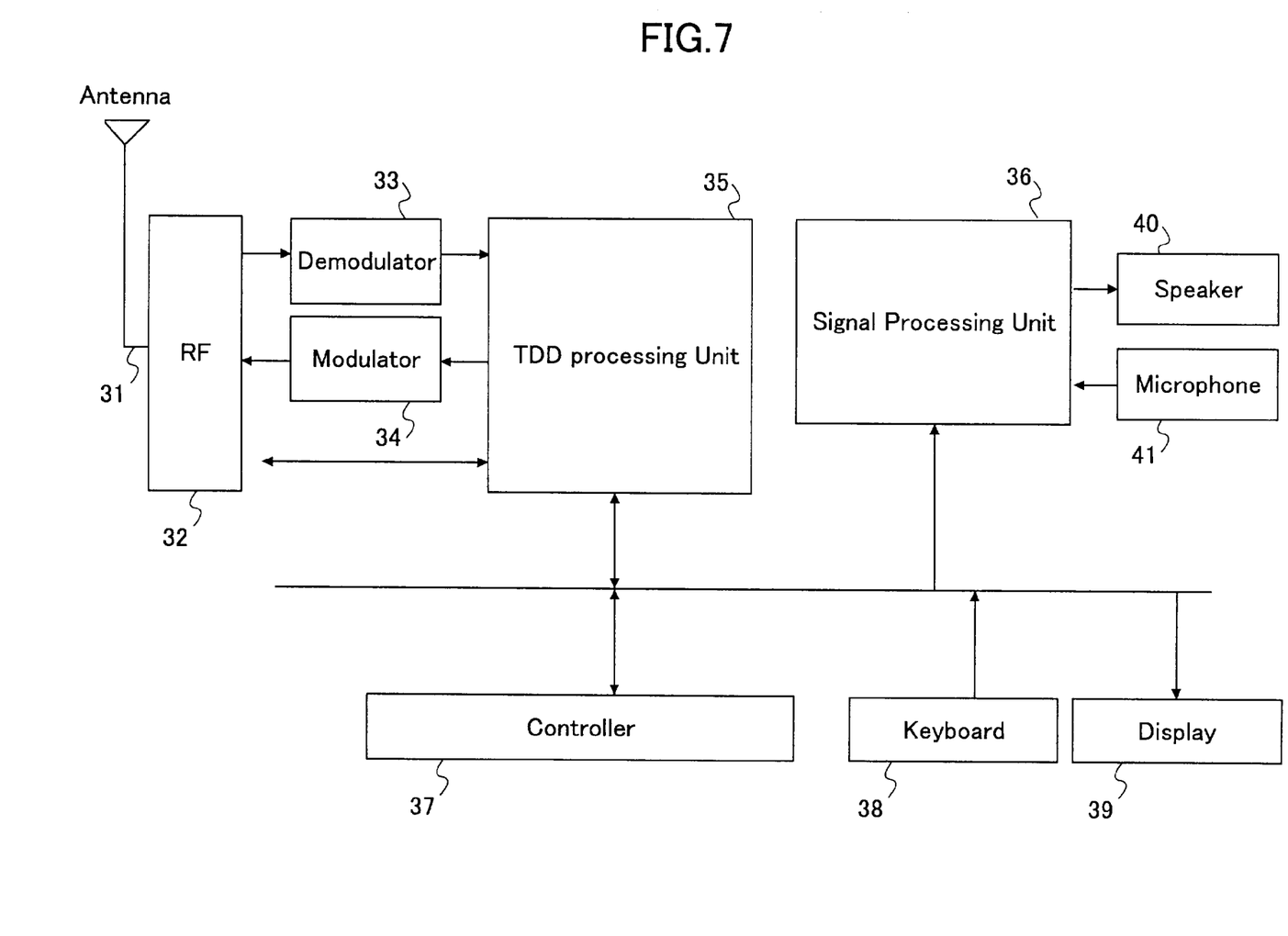
FIG. 7 illustrates the structure of the mobile station according to an embodiment of the invention.

FIG. 7 illustrates the structure of the mobile station 1-5. The mobile station 1-5 comprises an antenna 31, an RF processing unit 32, a demodulator 33, a modulator 34, a TDD processing unit 35, a signal processing unit 36, a controller 37, a keyboard 38, a display 39, a speaker 40, and a microphone 41.

The antenna 31 receives a radio frequency signal from the base station 1-1, and transmits a radio frequency signal to the base station 1-1. The RF processing unit 32 down-converts the signal received at the antenna 31 and supplies the converted signal to the demodulator 33. The RF processing unit 32 also up-converts the transmission signal output from the TDD processing unit 35 and modulated by the modulator 34. The modulator 34 and the demodulator 33 convert signals into a desired format.

The TDD processing unit 35 allocates the slots for transmitting and receiving signals to and from the base station and supplies a slot switching instruction to the RF processing unit 32. The signal processing unit 36 encodes and decodes the original signal. The signal processing unit 36 outputs analog audio signals to the speaker 40, or takes in the user's voice or sound from the microphone 41 and converts it into digital form. The controller 37 analyzes the up signal priority information set by the user using the keyboard 38, and designates a slot group used for uplink communications in accordance with the degree of priority.

Figure 8:
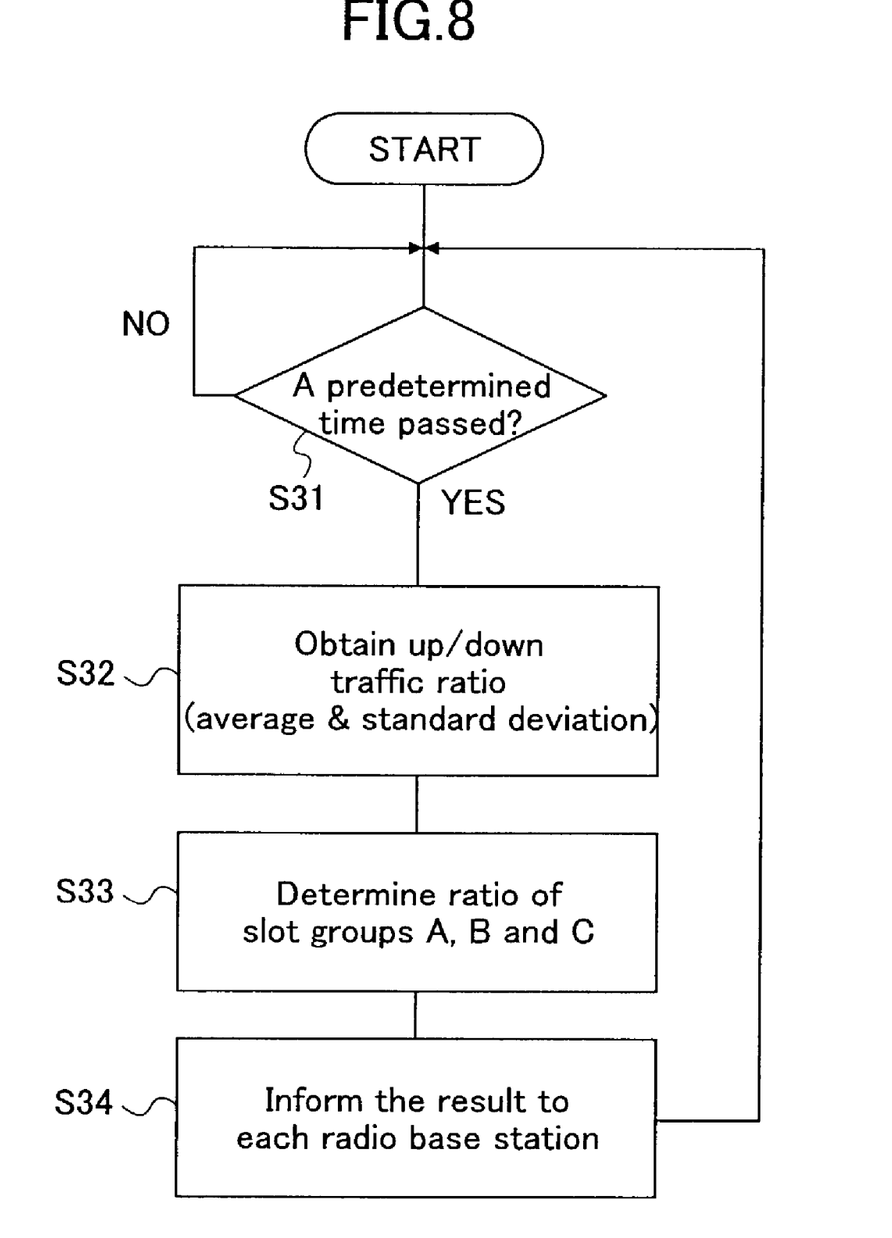
FIG. 8 illustrates an operation flow of determination of a ratio between slot groups A, B and C carried out by the base station control apparatus shown in FIG. 5.

FIG. 8 illustrates an operation flow of determining the ratio between slot groups A, B and C, which is carried out by the base station control apparatus 1-6. The base station control apparatus 1-6 determines the frame structure of the system based on the traffic information gathered from the base stations 1-1 through 1-4. In the embodiment, each base station samples uplink and downlink traffic data in a short interval time, and stores the sampling information in the internal memory (not shown). When the base station receives a traffic data collection command from the traffic data collecting unit 23 of the base station control apparatus 1-6, the base station supplies the sampling information stored in the memory as a responding message to the base station control apparatus 1-6.

The traffic data collecting unit 23 determines if a predetermined time has passed (in step S31). Every predetermined time (YES in S31), the traffic data collecting unit 23 generates and transmits a traffic data collection command to the base stations 1-1 through 1-4 via the corresponding interfaces $BS_1$ INTF through $BS_n$ INTF (in step S32). In other words, the traffic data collection command is not transmitted to the base station unless a predetermined time has passed (No in S31). The traffic data collecting unit 23 calculates the average of the up/down traffic ratios gathered from the base stations 1-1 through 1-4, which are contained in the responding messages from the base stations 1-1 through 1-4. The traffic data collecting unit 23 further calculates a standard deviation a from the average for each of the sampled uplink/downlink ratios in step S32.

The traffic data collecting unit 23 supplies the calculation results (that is, the average and the standard deviation $\sigma$) to the slot group determination group 24. The slot group determination unit 24 determines a slot ratio between groups A, B and C (in step S33) for each base station. The determined slot ratio is supplied to each base station via the associated BS interface (in step S34).

Figure 9:
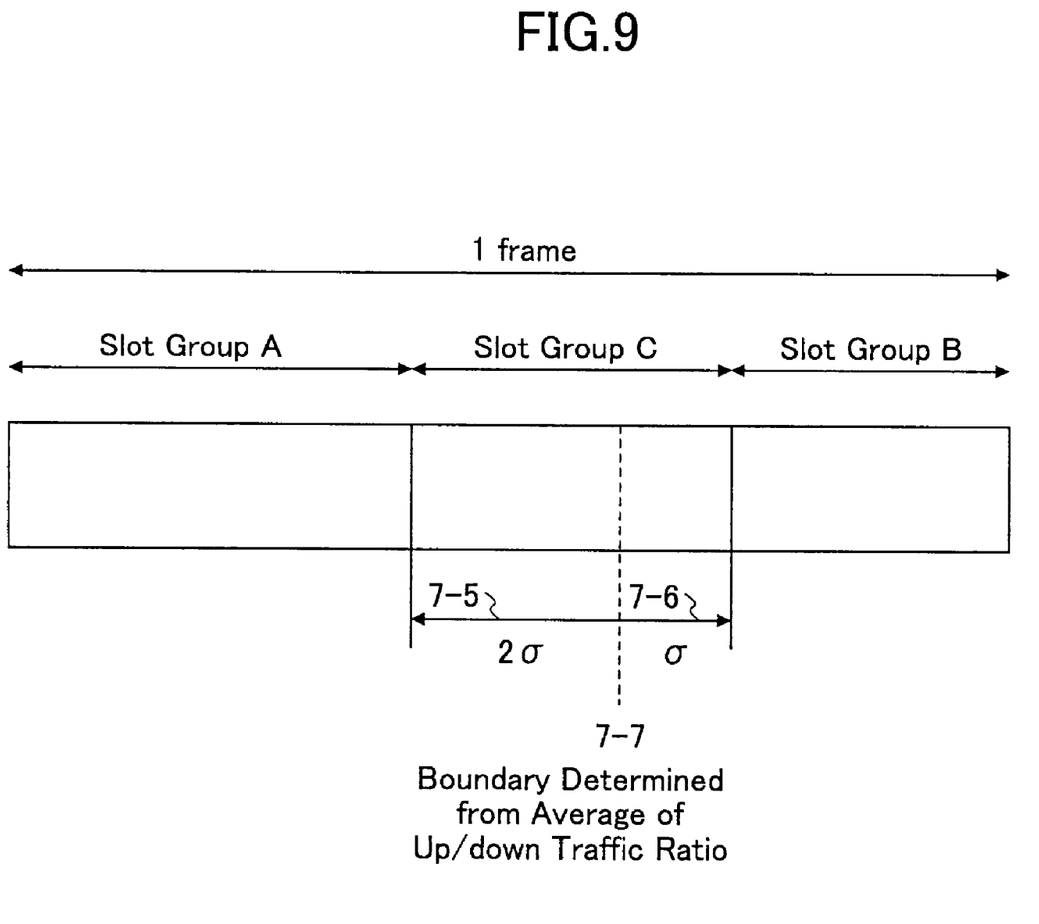
FIG. 9 illustrates a boundary between the uplink region and the downlink region determined from the average of the up/down traffic ratios obtained from the base stations included in the mobile communications system according to the invention.

FIG. 9 illustrates a boundary between the uplink region and the downlink region determined by the average of the up/down traffic ratios of the base stations.

The slot determination unit 24 of the base station control apparatus 1-6 sets the boundary 7-7 between the uplink slots and the downlink slots at a slot position corresponding to the average of the up/down traffic ratios gathered from the base stations 1-1 through 1-4. In addition, double of the standard deviation ($2\sigma$) from the boundary is assigned for the downlink slots 7-5, and the standard deviation ($\sigma$) from the boundary to the opposite direction is assigned for the uplink slots 7-6. The sum of the downlink slots 7-5 and the uplink slots 7-6 becomes the downlink priority slot group C. As to the remaining regions, the region near the beginning of the frame is assigned to slot group A, and the region near the end of the frame is assigned to slot group B. In this manner, one frame is constructed with a specific slot ratio between slot groups A, B and C. If the downlink region 7-5 and the uplink region 7-6 exceed the regions of slot group A and slot group B, the exceeding regions 7-5 and 7-6 are reduced to ½, ⅓, ¼ . . . .

By calculating a standard deviation ($\sigma$) from the average of the up/down traffic ratios of the base stations, the degree of change in the up/down traffic ratio can be grasped. If the standard deviation is small, dispersion from the average is small, and therefore, change in the up/down traffic ratio is small. If the standard deviation is large, dispersion from the average is large and the change in the up/down traffic ratio is large.

The range of the downlink priority slot (i.e., slot group C) is dynamically determined taking the current standard deviation into account. This arrangement also allows slot assignments for each cell in response to changes in up/down traffic ratio of that cell. Consequently, the radio channel efficiency can be greatly improved. If the time interval for generating a traffic data collection command is shortened, real-time slot assignment can also be realized reflecting the updated up/down traffic ratio.

Figure 10:
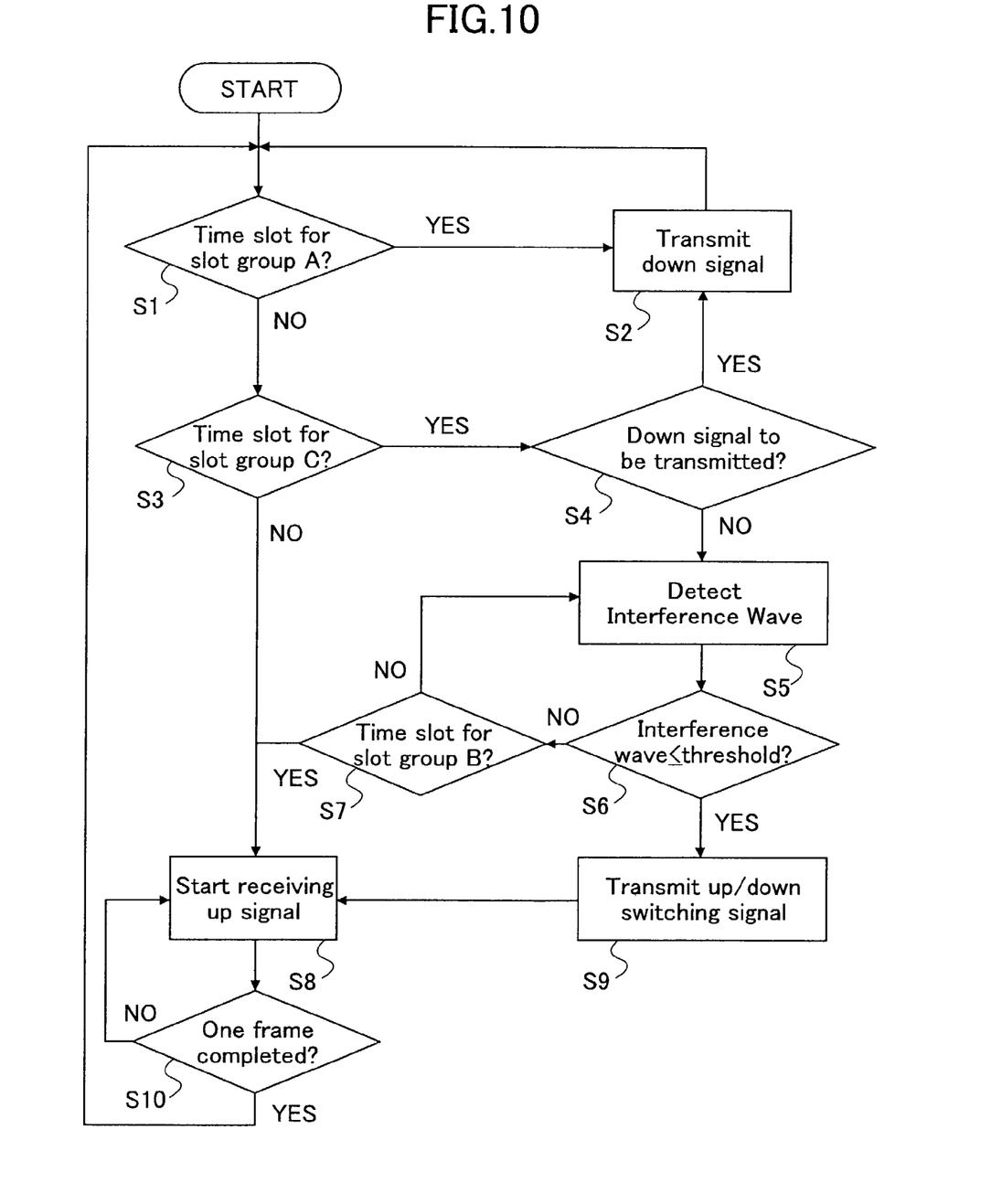
FIG. 10 illustrates an operation flow carried out by the base station shown in FIG. 6.

FIG. 10 illustrates an operation flow of the base station 1-1 that carries out signal transmission using slot groups A through C determined by the base station control apparatus 1-6.

The controller 18 (see FIG. 6) of the base station 1-1 determines whether or not there is a down signal that is to be transmitted at a timing of slot group A in the frame-synchronized channel (in step S1). If there is a down signals to be transmitted at a timing of slot group A (YES in S1), the controller 18 instructs the RF processing unit 12, via the TDD processing unit 16, to transmit the down signal by the end of slot group A (S2).

If the transmission timing of slot group A terminates (NO in S1), the controller 18 determines whether the next slot belongs to slot group C (in step S3). If the next slot belongs to slot group C (YES in S3), the controller 18 determines whether or not there is a down signal to be transmitted in slot C (in step S4). If there is a down signal to be transmitted in slot group C (YES in S4), the process returns to step S2 and the RF processing unit 12 transmits the down signal. If there is no down signal to be transmitted in slot group C (NO in S4), then the interference monitoring unit 15 starts monitoring the interference waves from the surrounding base stations 1-2 through 1-4 at interference determination timing for each slot (in step S5).

The interference monitoring unit 15 supplies the monitoring result to the controller 18. The controller determines whether the level of the interference waves is equal to or less than the predetermined threshold value (in step S6). If the interference level exceeds the threshold (NO in S6), then it is determined whether the next slot belongs to slot group B (in step S7). If it is not at the timing of slot group B yet (NO in S7), the determination result is supplied to the interference monitoring unit 15, which then continuously monitors the interference (in step S5). If it is determined that the next slot belong to slot group B (YES in S7), the controller 8 supplies an up/down switching command to the TDD processing unit 16 in order to switch the communication mode to the receiving mode. The TDD processing unit 16 starts receiving up signals in response to the command (in step S8).

If in step S6 there is no interference wave detected at a timing of slot group C, which means that the interference level is equal to or less than the threshold (YES in S6), then the controller 18 instructs the TDD processing unit 16 to generate an up/down switching signal at the next slot. The up/down switching signal is transmitted to the mobile station 1-5 (in step S9), and the base station 1-1 starts receiving up signals from the mobile station 1-5 (in step S8). If this frame terminates (YES in S10), the process returns to step S1 and the base station 1-1 carries out the process for the next frame. If the frame is not finished (NO in S10), the base station 1-1 continue to receive the up signal from the mobile station 1-5.

In this manner, the base station 1-1 transmits down signals using slot group A. If there are more down signals to be transmitted after slot group A is over, the base station 1-1 continuously transmits the down signals using the downlink priority slot (i.e., slot group C). Accordingly, even if data to be transmitted to the mobile station 1-5 are massive, the transmission of the data can be completed without interruption halfway through the transmission. The base station 1-1 can distribute real-time applications, such as visual images or music, to the mobile station 1-5 without a deterioration of the service quality.

If transmission of down signals is finished halfway through the downlink priority slot (i.e., slot group C), the base station 1-1 starts monitoring the interference from the surrounding base stations 1-2 through 1-4 using the remaining slots in slot group C. If the interference level lowers to or below the predetermined level during the period of slot group C, the base station 1-1 allows the mobile station 1-5 located in the cell C1 to transmit up signals to the base station 1-1. The mobile station 1-5 can then transmit up signals without being subjected to interference from the surrounding base stations 1-2 through 1-4, and therefore, signal deterioration due to interference can be greatly reduced.

Figure 11:
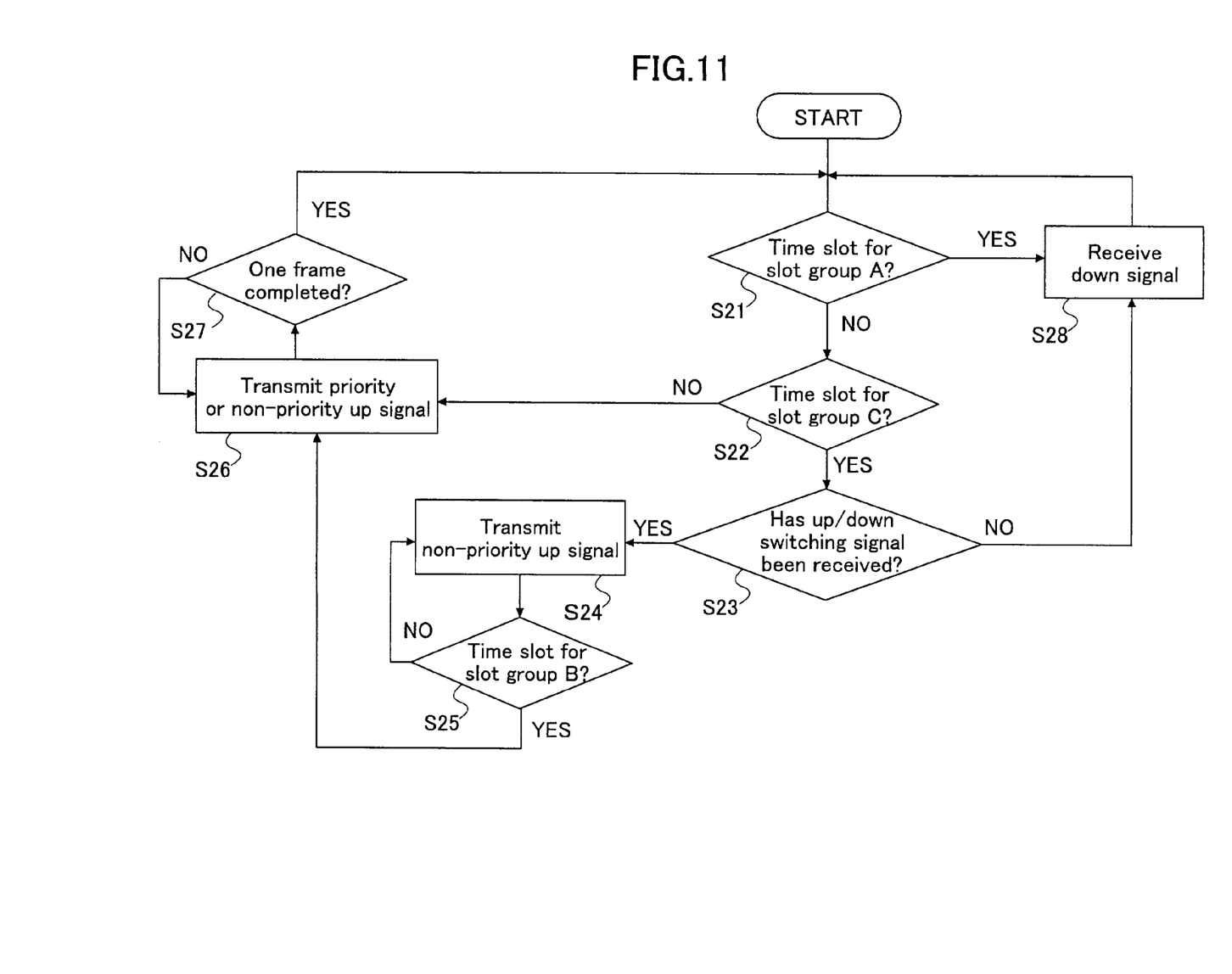
FIG. 11 illustrates an operation flow carried out by the mobile station shown in FIG. 7.

FIG. 11 illustrates an operation flow of the mobile station 1-5. If the current timing is at the timing of slot group A (YES in S21), the mobile station 1-5 receives down signals from the base station 1-1 (in step S28). Receiving the down signals continues until the period of slot group A terminates (NO in S21). After the time slots in slot group A have been used (NO in S21), the mobile station 1-5 continuously receives down signals from the base station 1-1 (S28) in slot group C (YES in S22) as long as no up/down switching signal has been received from the base station 1-1 (NO in S23). When receiving the up/down switching signal from the base station 1-1 at a timing of slot group C (YES in S22 and S23), the mobile station 1-5 starts transmitting an up signal with order of priority relatively low (which is referred to as a "non-priority up signal") as from the next slot (in step S24).

After the period of slot group A terminates (NO in S21) and if the subsequent slot does not belong to slot group C (NO in S22), the mobile station 1-5 transmits either a priority up signal or a non-priority up signal to the base station (in step S26).

In this manner, the controller 37 of the mobile station 1-5 determines whether an up/down switching signal has been received from the base station 1-1 at the timing of slot group C, and if so, the controller 37 instructs the TDD processing unit 35 to transmit a non-priority up signal to the base station 1-1 at the timing of slot group C. If the current timing is not included in slot group A or C, the controller 37 instructs the TDD processing unit 35 to transmit either a priority up signal or non-priority up signal to the base station.

A non-priority up signal is transmitted using the latter portion of slot group C (S24). If transmission timing moves to slot group B (YES in S25), up signals with either higher priority or lower priority are transmitted (S26). If the present timing is not in slot group B (NO in S25), a non-priority up signal is continuously transmitted.

When a priority up signal or non-priority up signal has been transmitted at timing of slot group B (s26), it is determined if this frame is completed (in step S27). When the current frame is finished (YES in S27), the process is repeated for the next frame. If the frame has not been finished (NO in S27), a priority or non-priority up signal is continuously transmitted to the base station at timing of slot group B (S26).

The order of priority is set to up signals in advance. Priority information is inserted in up signals by the signal processing unit 36 based on the user's instruction. For example, important messages are given higher priorities. The controller 37 determines which slot is to be assigned to which signal depending on the order of priority. When transmitting up signals of higher priorities, slot group B in which the probability of suffering from interference is relatively low is used. For up signals of lower priorities, slot group C is used. This arrangement guarantees the signal quality of higher priority up signals.

In the above described examples, a time slot assignment includes determination of a slot ratio between slot groups A, B and C carried out by the base station control apparatus 1-6.

Transmitting down signals from the base station 1-1 at the timing of slot group A (S1 and S2 in FIG. 10) may be referred to as the first transmission of down-signals. Transmitting down signals from the base station at the timing of slot group C (S3→S4→S2) may be referred to as the second transmission of down-signals. A series of steps of detecting interference (S5) and transmitting an up/down switching signal (S9) may be referred to as environment-dependent transmission control. Transmitting an up/down switching signal (S9) may be referred to as transmission of switching control signal. Receiving up signals at the timing of slot group B (S3→S8 and S7→S8) may be referred to as the first receiving of up signals. Receiving up signals when the interference satisfies a predetermined condition (S6→S9→S8) may be referred to as the second receiving of up signals.

As to the mobile station 1-5, receiving down signals at the timing of slot group A (S21→S28) may be referred to as the first receiving of down signals. Transmitting up signals to the base station at the timing of slot group B (S22→S26) may be referred to as the first transmission of up signals. Transmitting up signals in response to the up/down switching signal (S23→S24) may be referred to as priority-dependent signal transmission. Receiving the up/down switching signal (S23) may be referred to as receiving a switching control signal. Receiving down signals from the base station at the timing of slot group C before receiving the up/down switching signal (S23→S28) may be referred to as the second receiving of down signals. Transmitting up signals using a portion of slot group C (S23→S24) may be referred to as the second transmission of up signals.

As has been described above, with a time slot assigning method of the present invention, a radio frame is divided into two or more (three in the embodiment) sections based on the uplink and downlink traffic conditions. Among slot groups A, B, and C (or the first, second, and third slot groups) in the embodiment, slot group C (i.e., the third slot group) is used as a multipurpose slot group. For example, slot group C is used to transmit both down signals and up signals depending on the communication environment (e.g., the interference state), or alternatively, it may be used for other purposes. Assignment of slot groups A, B and C is flexible corresponding to uplink and downlink traffic for each cell.

With the signal transmission method of the invention, if there are no more down signals to be transmitted halfway through slot group C, interference from surrounding stations is monitored using the remaining portion of slot group C. If interference is not detected (or if the level of the interference is at or below the threshold), an up/down switching signal (or an up-signal permission signal) is transmitted to the mobile station in order to allow the mobile station to transmit up signals using the remaining portion of slot group C. By using slot group C for multiple purposes depending on the conditions of the communication environment, interference from adjacent cells due to different transmission timings among these cells can be substantially reduced.

The base station control apparatus determines the slot ratio of at least two different slot groups based on the above-described time slot assigning method.

A base station and a mobile station located in the cell controlled by the base station transmit and receive signals to each other using slot groups determined by the base station control apparatus.

Although the present invention has been described using specific examples, it is not limited to those examples, but many substitutions and modifications can be made without departing from the scope of the invention. For example, although three slot groups are provided in a frame in the embodiment, two slot groups may be used as long as one of them is used as a multi-purpose slot group that can dynamically cope with changes in traffic, and as long as both an uplink slot and a downlink slot are guaranteed.

This patent application is based on and claims the benefit of the earlier filing date of Japanese patent application No. 2001-216453 filed Jul. 17, 2001, the entire contents of which are hereby incorporated by reference.

What is claimed is:

1. A time slot assigning method of assigning time slots to transmit signals between a base-station and a mobile station in each frame, the method comprising;
   assigning a first slot group to transmit downlink signals from the base station to the mobile station, the first slot group consisting of one or more successive time slots;
   assigning a second slot group to receive uplink signals at the base station from the mobile station, the second slot group consisting of one or more successive time slots;
   arranging a third slot group consisting of one or more successive time slots immediately after the first slot group,
   wherein the time slots of the third slot group are used first to continue to transmit downlink signals from the base station when all of the time slots of the first slot group have been used but there are downlink signals awaiting transmission; and
   when the transmission of all the downlink signals awaiting transmission is completed and an interference level due to surrounding base stations is detected to be below a prescribed level, remaining time slots of the third slot group are used to receive uplink signals.

2. The method according to claim 1, further comprising:
   defining an interference monitoring slot in the third slot group to monitor interference levels associated with surrounding base stations.

3. The method according to claim 1, further comprising:
   providing a switching slot in the third slot group so that a time slot after the switching slot in the third slot group is used to receive uplink signals from the mobile station.

4. The method according to claim 2, further comprising:
   providing a switching slot in the third slot group if an interference level monitored in the interference monitoring slot satisfies the prescribed level.

5. The method according to claim 4, wherein a time slot after the switching slot in the third slot group is used to transmit uplink signals from the mobile station to the base station.

6. The method according to claim 1, further comprising:
   determining ratios of individual time slots to be allocated to each of the first slot group, the second slot group, and the third slot group, based on uplink traffic and downlink traffic between the base station and the mobile station.

7. A signal transmission method for transmitting signals between a base station and a mobile station in a mobile communication system, the method comprising:
   determining a first slot group, a second slot group, and a third slot group in each radio frame, the third slot group being used for multiple purposes,
   wherein each of the first, second and third slot groups consist of one or more successive time slots, and the time slots of the third slot group are arranged immediately after the time slots of the first slot group;
   receiving uplink signals at the base station from the mobile station using the second slot group;
   transmitting downlink signals from the base station to the mobile station using the first slot group;
   continuing transmitting downlink signals using the third slot group when all of the slots of the first slot group have been used but there are downlink signals awaiting transmission; and
   switching from transmitting downlink signals to using available slots of the third slot group in receiving uplink signals at the base station from the mobile station only when the transmission of all downlink signals awaiting transmission is completed and an interference level from surrounding base stations is detected to be below a prescribed level.

8. The signal transmission method according to claim 7, further comprising:
   monitoring interference from surrounding base stations using a portion of the third slot group;
   determining whether the interference satisfies the prescribed level; and
   generating a switching signal when the interference satisfies the prescribed level in order to allow the mobile station to transmit uplink signals to the base station using slots of the third slot group.

9. The signal transmission method according to claim 8, further comprising:
   determining an order of priority for the uplink signals to be transmitted and transmitting uplink signals of lowest determined priority using the available time slots in the third slot group after the switching signal is generated.

10. A base station control apparatus provided between a base station and a mobile station in a mobile communications system, the base station control apparatus comprising:
    a traffic data collecting unit configured to collect traffic data from the base station; and
    a slot group determination unit configured to assign, in each frame, a first slot group to transmit downlink signals from the base station to the mobile station, a second slot group to receive uplink signals at the base station from the mobile station, and a third slot group being used for multiple purposes, based on the traffic data collected at the traffic data collecting unit,
    wherein each of the first, second and third slot groups consist of one or more successive time slots, and the time slots of the third slot group are arranged immediately after the time slots of the first slot group, and
    the base station control apparatus is configured to switch from transmitting downlink signals using the third slot group to receiving uplink signals using the third slot group when the transmission of all the downlink signals awaiting transmission is determined to be completed and it is detected that an interference level due to surrounding base stations is below a prescribed level.

11. The base station control apparatus according to claim 10, wherein the slot group determination unit determines ratios of individual time slots to be allocated to each of the first slot group, the second slot group, and the third slot group, based on the traffic data collected at the traffic data collecting unit.

12. The base station control apparatus according to claim 11, wherein the traffic data collecting unit calculates a ratio of uplink traffic to downlink traffic from the traffic data collected from the base station, and the slot group determination unit determines the time slot ratio between the first slot group, the second slot group, and the third slot group based on the ratio of uplink traffic to downlink traffic.

13. The base station control apparatus according to claim 10, wherein the base station control apparatus allows the base station to use the third slot group to monitor interference with surrounding base stations when transmission of all downlink signals awaiting transmission is completed.

14. A base station in a mobile communications system, comprising:
- an interface for receiving assignment of time slots for each frame from an external control apparatus, said frame including a first slot group, a second slot group, and a third slot group,
- wherein each of the first, second and third slot groups consist of one or more successive time slots, and the time slots of the third slot group are arranged immediately after the time slots of the first slot group;
- a controller connected to the interface and configured to cause the base station to transmit downlink signals to a mobile station using the first slot group, to cause the base station to first use the time slots of the third slot group to transmit downlink signals when all of the time slots of the first slot group have been used but there are downlink signals awaiting transmission, and to cause the base station to receive uplink signals from the mobile station using the second slot group,
- wherein the controller is configured to receive uplink signals from the mobile station at the base station using remaining time slots of the third slot group after transmission of all downlink signals awaiting transmission is completed, and an interference level from surrounding base stations is detected to be below a prescribed level.

15. The base station according to claim 14 further comprising:
- an interference monitoring unit configured to monitor interference from surrounding base stations and to supply a monitoring result to the controller, wherein the controller determines whether the monitoring result satisfies the predetermined condition, and if the predetermined condition is satisfied, the controller causes the base station to receive uplink signals from the mobile station using the remaining time slots of the third slot group.

16. The base station according to claim 15, wherein the controller causes the base station to transmit a switching control signal to the mobile station if the monitoring result satisfies the prescribed level.

17. A mobile station comprising:
- a radio frequency processing unit for receiving downlink signals transmitted from a base station using a first slot group in a frame including the first slot group, a second slot group, and a third slot group and for transmitting uplink signals to the base station using the second slot group,
- wherein each of the first, second and third slot groups consists of one or more successive time slots, and the time slots of the third slot group are arranged immediately after the time slots of the first slot group;
- a controller configured to cause the radio frequency processing unit to receive downlink signals from the base station using the time slots of the third slot group in the frame when all of the time slots of the first slot group have been used but there are downlink signals awaiting transmission, and to transmit uplink signals to the base station using remaining time slots of the third slot group after transmission of all downlink signals awaiting transmission is completed and an interference level from surrounding base stations is detected to be below a prescribed level; and
- a signal processing unit configured to set an order of priority for transmission of uplink signals to the base station, wherein the controller causes the radio frequency processing unit to transmit uplink signals of lowest priority using the remaining time slots of the third slot group.

18. The mobile station according to claim 17, wherein the controller determines whether a switching control signal has been received in the third slot group, and if so, the controller causes the radio frequency processing unit to transmit the lowest priority uplink signals to the base station using the remaining time slots of the third slot group.

* * * * *